(No Model.)

J. W. CAMPBELL.
TOWEL RACK.

No. 420,184. Patented Jan. 28, 1890.

Witnesses
John Dicken
O. L. Sundgren

Inventor
James W. Campbell
by his Attorneys
Brown & Griswold

UNITED STATES PATENT OFFICE.

JAMES W. CAMPBELL, OF GERMANTOWN, ASSIGNOR TO FERGUSON BROTHERS, OF NEW YORK, N. Y.

TOWEL-RACK.

SPECIFICATION forming part of Letters Patent No. 420,184, dated January 28, 1890.

Application filed May 10, 1889. Serial No. 310,262. (No model.)

*To all whom it may concern:*

Be it known that I, JAMES W. CAMPBELL, of Germantown, in the county of Columbia and State of New York, have invented a certain new and useful Improvement in Towel-Racks, of which the following is a specification.

I will describe in detail a towel-rack embodying my improvement, and then point out the novel features in the claim.

Figure 1:
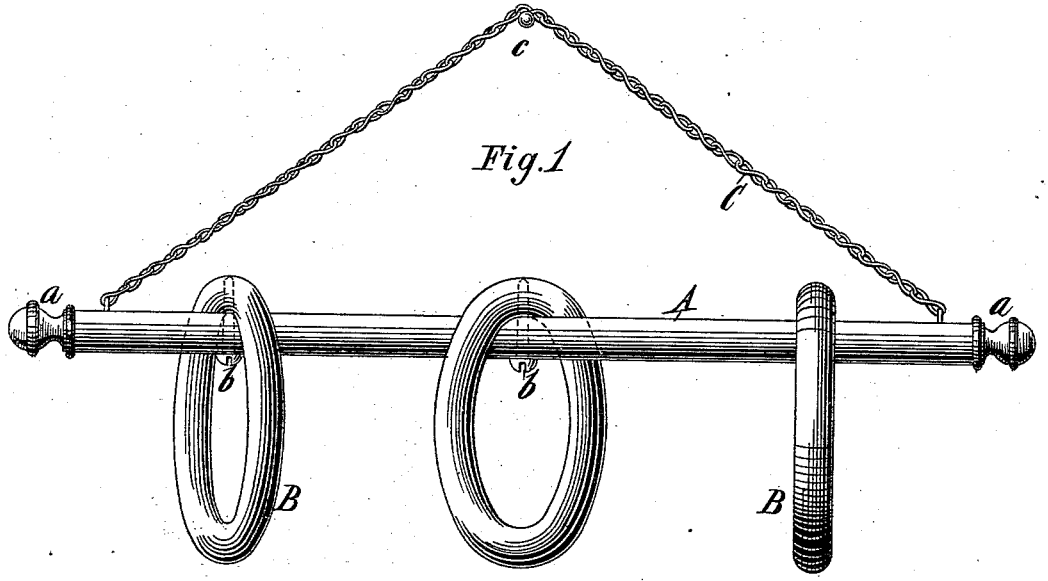
Figure 2:
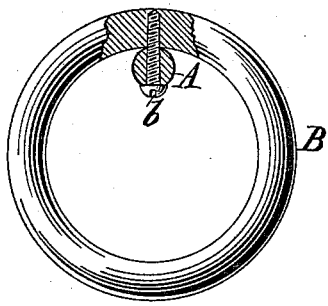

In the accompanying drawings, Figure 1 is a side elevation of a towel-rack embodying my improvement. Fig. 2 is a detail view, partly in section.

Similar letters of reference designate corresponding parts in both the figures.

A designates a bar or pole, which may be made of wood. I have shown it provided at its ends with tips $a$.

B designates rings which are made independently of the bar or pole, and may also be made of wood. These rings are secured to the bar at distances apart and depend from the bar. They are secured, as shown, by passing screws $b$ through the bar or pole A, and also through or nearly through the rings B. The screws $b$ constitute pivots in the present example of my invention, upon which the rings may be separately turned or adjusted so as to stand obliquely to the axis of the bar or pole. I have shown two of the rings so turned in Fig. 1, one at a greater angle than the other. The rings need not, however, necessarily turn upon the screws $b$, nor, in fact, need screws be used, as rivets might be used, and the rings might be so secured as to prevent their turning.

Secured to the pole or bar A near its ends is a chain C, by which the towel-rack may be hung on a nail $c$, extending from any suitable support. This chain operates to maintain the bar or pole in a horizontal position and the rings vertical when the rack is in use.

The towels to be carried by the towel-rack are passed through the rings B and depend therefrom. By adjusting the rings obliquely on their pivots, where such are used, the rack may be caused to lie closer to a wall than it otherwise would.

What I claim as my invention, and desire to secure by Letters Patent, is—

In a towel-rack, the combination, with a number of rings, of a bar or pole extending through said rings, and pivots extending through both the rings and the bar or pole upon which said rings may be turned, so as to stand oliquely to the axis of the bar or pole, substantially as specified.

JAMES W. CAMPBELL.

Witnesses:
  FREDK. HAYNES,
  GEO. BARRY.